(12) United States Patent
Denier et al.

(10) Patent No.: US 7,053,300 B2
(45) Date of Patent: May 30, 2006

(54) MULTI-FUNCTIONAL ELECTRIC SUPPORT BRACKET

(75) Inventors: Dennis J. Denier, Cincinnati, OH (US); Dennis Hickey, Cincinnati, OH (US); Charles H. Bull, Fairfield, OH (US); Joseph P. Kallmeyer, Cincinnati, OH (US)

(73) Assignee: Denier Electric Company, Inc., Ross, OH (US)

( * ) Notice: Subject to any disclaimer, the term of this patent is extended or adjusted under 35 U.S.C. 154(b) by 0 days.

(21) Appl. No.: 10/888,858

(22) Filed: Jul. 9, 2004

(65) Prior Publication Data

US 2006/0005987 A1    Jan. 12, 2006

(51) Int. Cl.
*H01H 9/02*    (2006.01)

(52) U.S. Cl. ............... 174/58; 174/50; 174/63; 220/3.3; 220/3.7; 220/3.9; 248/906; 248/200

(58) Field of Classification Search ............ 174/50, 174/48, 53, 57, 58, 54, 61, 63; 220/3.2, 3.3, 220/3.4, 3.5, 3.6, 3.7, 3.8, 3.9; 248/906, 248/200, 205.7, 300, 343, 27.1, 298.1; 312/245; 439/535
See application file for complete search history.

(56) References Cited

U.S. PATENT DOCUMENTS

| | | |
|---|---|---|
| 1,113,092 A | 10/1914 | Beugler |
| 1,288,024 A | 12/1918 | Kendig |
| 1,531,423 A | 3/1925 | Simpson |
| 1,675,921 A | 7/1928 | Buchanan |
| 2,032,636 A | 3/1936 | Seckinger .................. 247/21 |
| 2,042,620 A | 6/1936 | Noyes ........................ 247/15 |
| 2,233,548 A | 3/1941 | Mroziak .................... 248/221 |
| 2,269,211 A * | 1/1942 | Kuykendall ............... 248/906 |
| 2,297,862 A | 10/1942 | Bachmann ................. 220/3.7 |
| 2,324,791 A | 7/1943 | McLoughlin et al. ....... 174/60 |
| 2,480,805 A | 8/1949 | Buckels ..................... 248/221 |
| 2,990,172 A | 6/1961 | Gianotta .................... 269/116 |
| 2,997,265 A | 8/1961 | Weiss ......................... 248/68 |
| 3,767,151 A | 10/1973 | Seal et al. ............... 248/205 R |
| 4,041,657 A * | 8/1977 | Schuplin ................... 248/343 |
| 4,057,164 A | 11/1977 | Maier ........................ 220/3.6 |
| 4,296,870 A * | 10/1981 | Balkwill et al. ............ 174/57 |
| 4,447,030 A | 5/1984 | Nattel ...................... 248/27.1 |
| 4,561,615 A | 12/1985 | Medlin, Jr. ............... 248/27.1 |
| 4,569,458 A | 2/1986 | Horsley ..................... 220/3.6 |
| 4,572,391 A | 2/1986 | Medlin ...................... 220/3.9 |

(Continued)

OTHER PUBLICATIONS

Denier Manufacturing, *ROUGH-IN Ready Product Brochure*, 4 pp. 2003.

*Primary Examiner*—Angel R. Estrada
(74) *Attorney, Agent, or Firm*—Wood, Herron & Evans, L.L.P.

(57) ABSTRACT

A multi-purpose bracket for supporting electric boxes in a stud wall which can be attached directly to a stud, between two adjacent studs, or supported from the floor, includes a mounting bracket that includes four tabs that are adapted to attach to a vertically slotted base unit. Further, the bracket includes a cable support having an edge which aligns with a stabilizing leg of the bracket which allows it to align itself to a metal stud. An edge of the bracket is then screwed to the metal stud. Further, the bracket includes channels which receive straps which can be used to support the bracket between two adjacent studs without use of the floor support.

15 Claims, 7 Drawing Sheets

U.S. PATENT DOCUMENTS

| | | | |
|---|---|---|---|
| 4,603,789 A | 8/1986 | Medlin, Sr. | 220/3.9 |
| 4,645,089 A | 2/1987 | Horsley | 220/3.6 |
| 4,688,693 A | 8/1987 | Medlin, Jr. | 220/3.9 |
| 4,732,356 A | 3/1988 | Medlin, Sr. | 248/27.1 |
| 4,753,361 A | 6/1988 | Medlin, Jr. | 220/3.6 |
| 4,757,908 A | 7/1988 | Medlin, Sr. | 220/3.9 |
| 4,790,505 A | 12/1988 | Rose et al. | 248/205.1 |
| 4,832,297 A | 5/1989 | Carpenter | 248/205.1 |
| 4,840,334 A | 6/1989 | Kikuchi | 248/73 |
| 4,863,399 A | 9/1989 | Medlin, Jr. | 439/538 |
| 4,964,525 A | 10/1990 | Coffey et al. | 220/3.9 |
| 5,005,792 A | 4/1991 | Rinderer | 248/205.1 |
| 5,009,383 A * | 4/1991 | Chapman | 248/343 |
| 5,031,789 A | 7/1991 | Dauberger | 220/3.9 |
| 5,067,677 A | 11/1991 | Miceli | 248/68.1 |
| 5,098,046 A | 3/1992 | Webb | 248/27.1 |
| 5,114,105 A | 5/1992 | Young | 248/27.1 |
| 5,141,185 A | 8/1992 | Rumbold et al. | 248/71 |
| 5,158,478 A | 10/1992 | Schuplin | 439/538 |
| 5,176,345 A | 1/1993 | Medlin | 248/205.1 |
| 5,221,814 A | 6/1993 | Colbaugh et al. | 174/66 |
| 5,224,673 A | 7/1993 | Webb | 248/27.1 |
| 5,263,676 A | 11/1993 | Medlin, Jr. et al. | 248/300 |
| 5,288,041 A | 2/1994 | Webb | 248/27.1 |
| 5,378,174 A | 1/1995 | Brownlie et al. | 439/709 |
| 5,405,111 A | 4/1995 | Medlin, Jr. | 248/205.1 |
| 5,423,499 A | 6/1995 | Webb | 248/27.1 |
| 5,448,011 A | 9/1995 | Laughlin | 174/48 |
| 5,452,873 A | 9/1995 | Laughlin | 248/205.1 |
| 5,527,990 A | 6/1996 | Comerci et al. | 174/48 |
| 5,595,362 A | 1/1997 | Rinderer et al. | 248/27.1 |
| 5,646,371 A | 7/1997 | Fabian | 174/58 |
| 5,810,303 A | 9/1998 | Bourassa et al. | 248/205.1 |
| 5,913,787 A | 6/1999 | Edwards | 52/220.7 |
| 6,098,939 A | 8/2000 | He | 248/205.1 |
| 6,147,304 A | 11/2000 | Doherty | 174/48 |
| 6,147,306 A | 11/2000 | Wilkins | 174/58 |
| 6,188,022 B1 | 2/2001 | He | 174/58 |
| 6,375,017 B1 | 4/2002 | Schattner et al. | 211/85.13 |
| 6,384,334 B1 | 5/2002 | Webb | 174/58 |
| 6,573,449 B1 | 6/2003 | Vrame | 174/58 |
| 6,590,155 B1 | 7/2003 | Vrame et al. | 174/50 |
| 6,723,918 B1 | 4/2004 | Vrame | 174/50 |
| 6,765,146 B1 * | 7/2004 | Gerardo | 174/58 |
| 6,803,521 B1 * | 10/2004 | Vrame | 174/58 |
| 6,871,827 B1 | 3/2005 | Petak et al. | 248/300 |
| 2003/0182881 A1 * | 10/2003 | Denier et al. | |
| 2005/0067546 A1 * | 3/2005 | Dinh | |

* cited by examiner

MULTI-FUNCTIONAL ELECTRIC SUPPORT BRACKET

BACKGROUND OF THE INVENTION

Electric boxes are mounted in walls to support electrical outlets such as duplex outlets, light switches, and the like, along with a wide variety of other electrical components. In walls formed with wood studs, it is typical to simply screw or nail an electric box to the stud. With walls formed from metal studs, and particularly in commercial buildings, the electric boxes tend to be supported by brackets that attach either to the floor or to a metal stud.

The electric boxes can be supported in several different ways. They can be supported on a bracket that rests on the floor, they can be supported on a bracket that attaches directly to a metal stud, or they can be attached between two metal studs, which would require something that bridges the metal studs. This requires the manufacturer to have at least three separate mounting brackets that must be supplied to the construction site.

SUMMARY OF THE INVENTION

The present invention is premised on the realization that a single mounting bracket that can be used supported from the floor, supported directly on a metal stud, or supported between adjacent studs, can be provided wherein the bracket has a mounting plate that has tabs adapted to attach to a floor stand. Further, the plate will include side portions adapted to screw onto a metal stud and, further, will include alignment projections that establish the mounting plate parallel to the stud and allow a second mounting plate to be mounted on the opposite side of the stud. Further, the mounting plate includes channels adapted to support straps that extend between adjacent studs to mount the electric box between two studs. The objects and advantages of the present invention will be further appreciated in light of the following detailed descriptions and drawings in which:

DETAILED DESCRIPTION OF THE DRAWINGS

Figure 1:
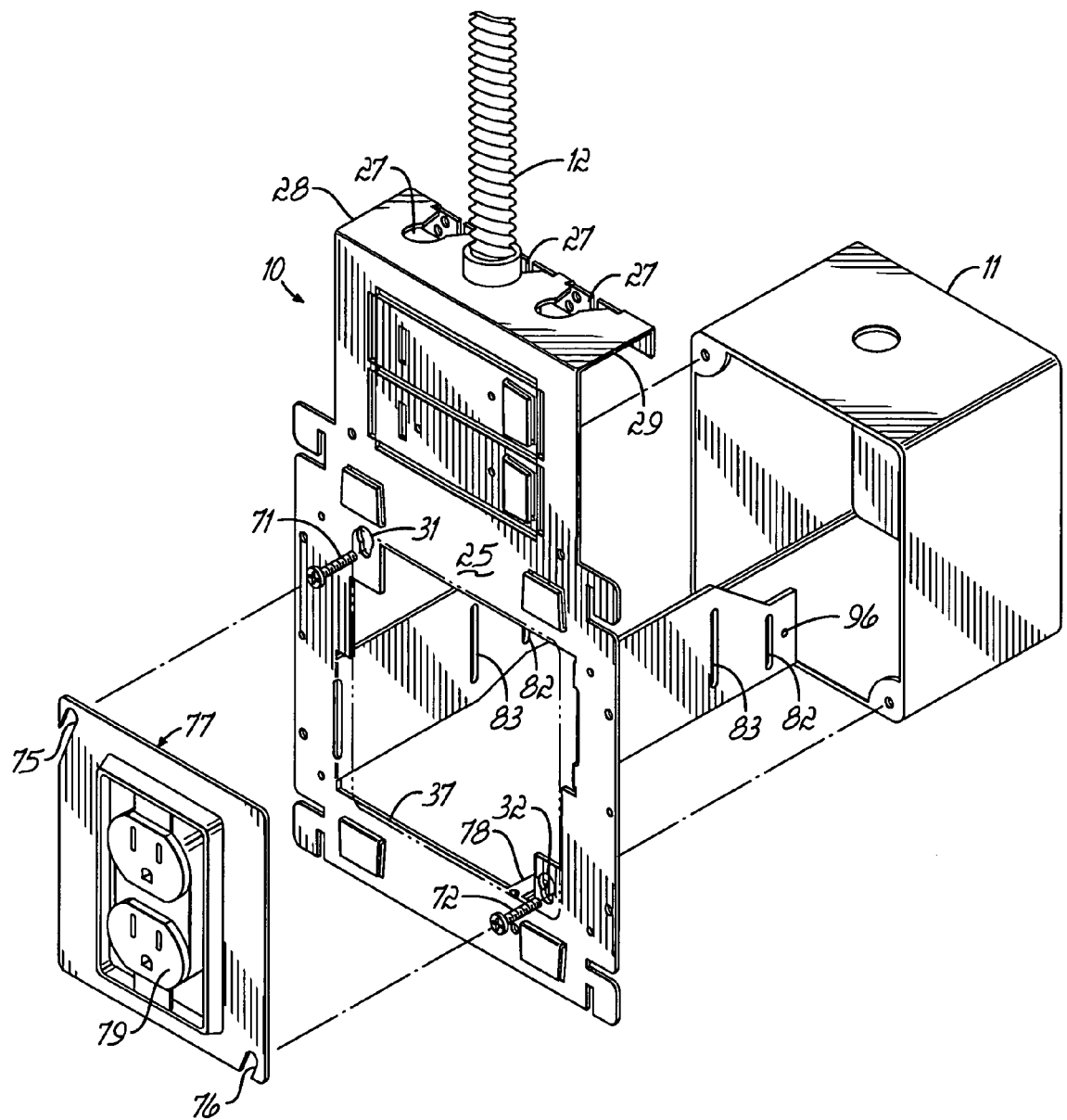
FIG. 1 is an exploded view of a portion of the mounting bracket for use in the present invention.
Figure 3:
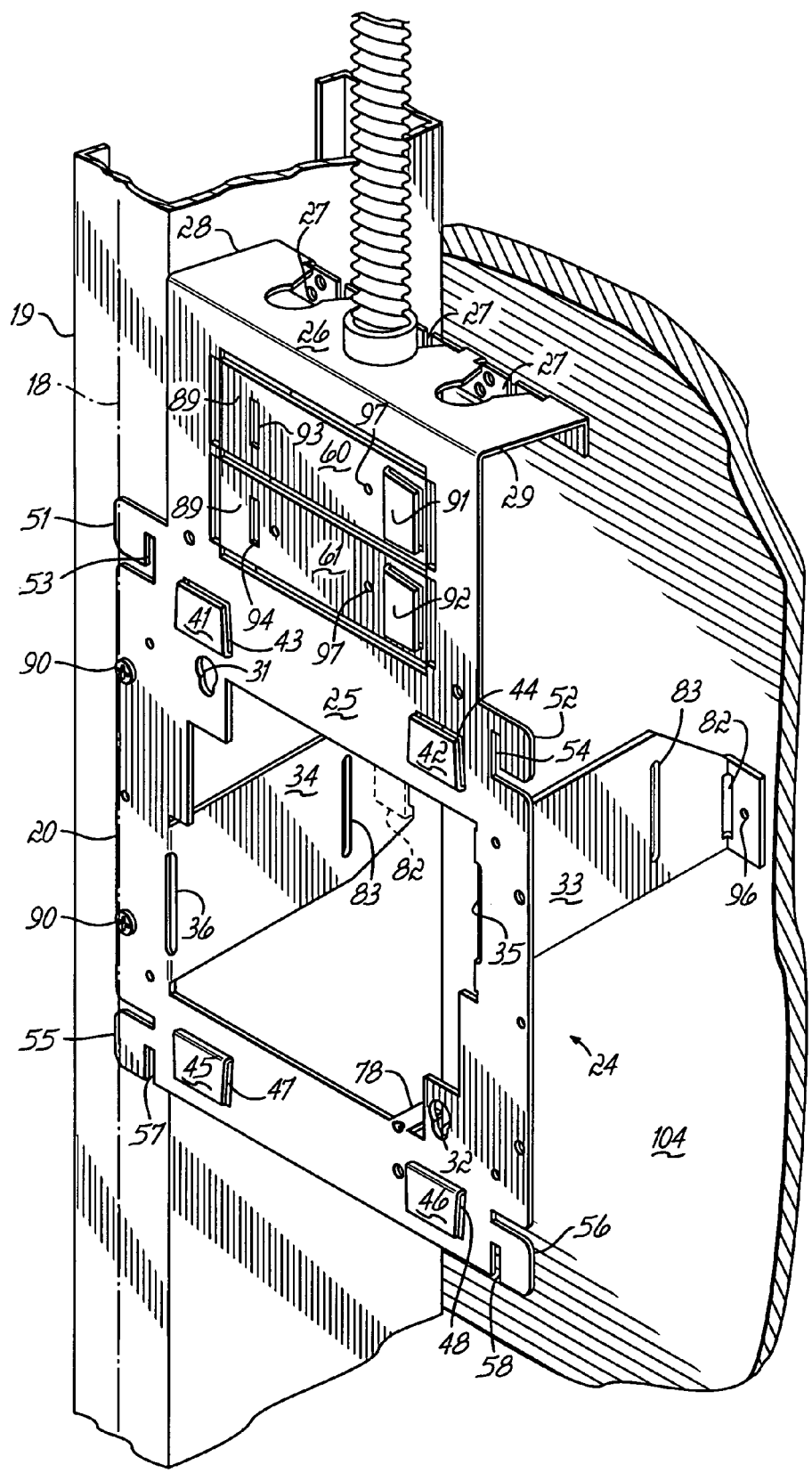
FIG. 3 is a perspective view partially broken away showing the electric bracket attached to a metal stud.
Figure 4:
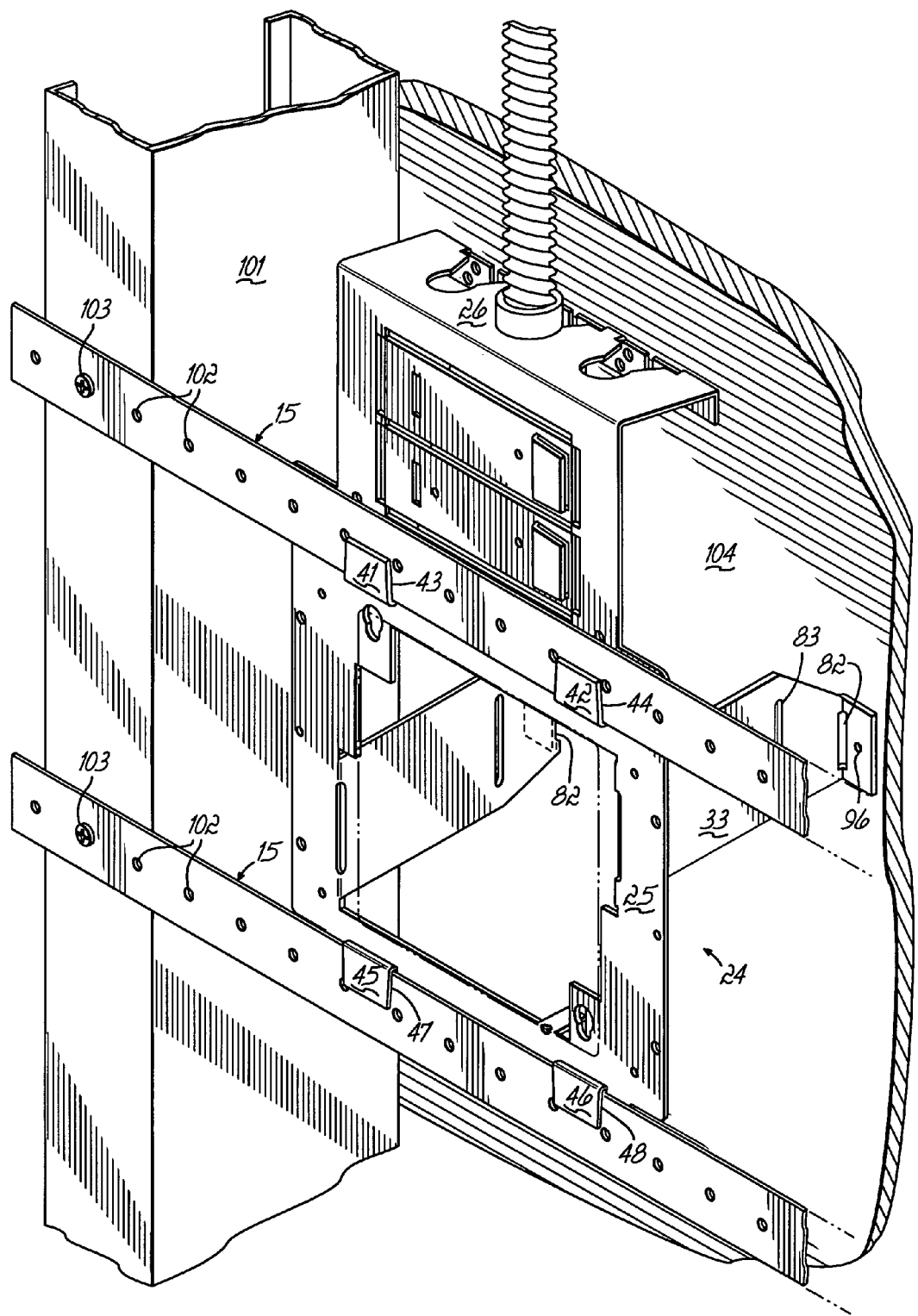
FIG. 4 is a perspective view partially broken away showing the metal bracket attached between two adjacent studs.
Figure 6:
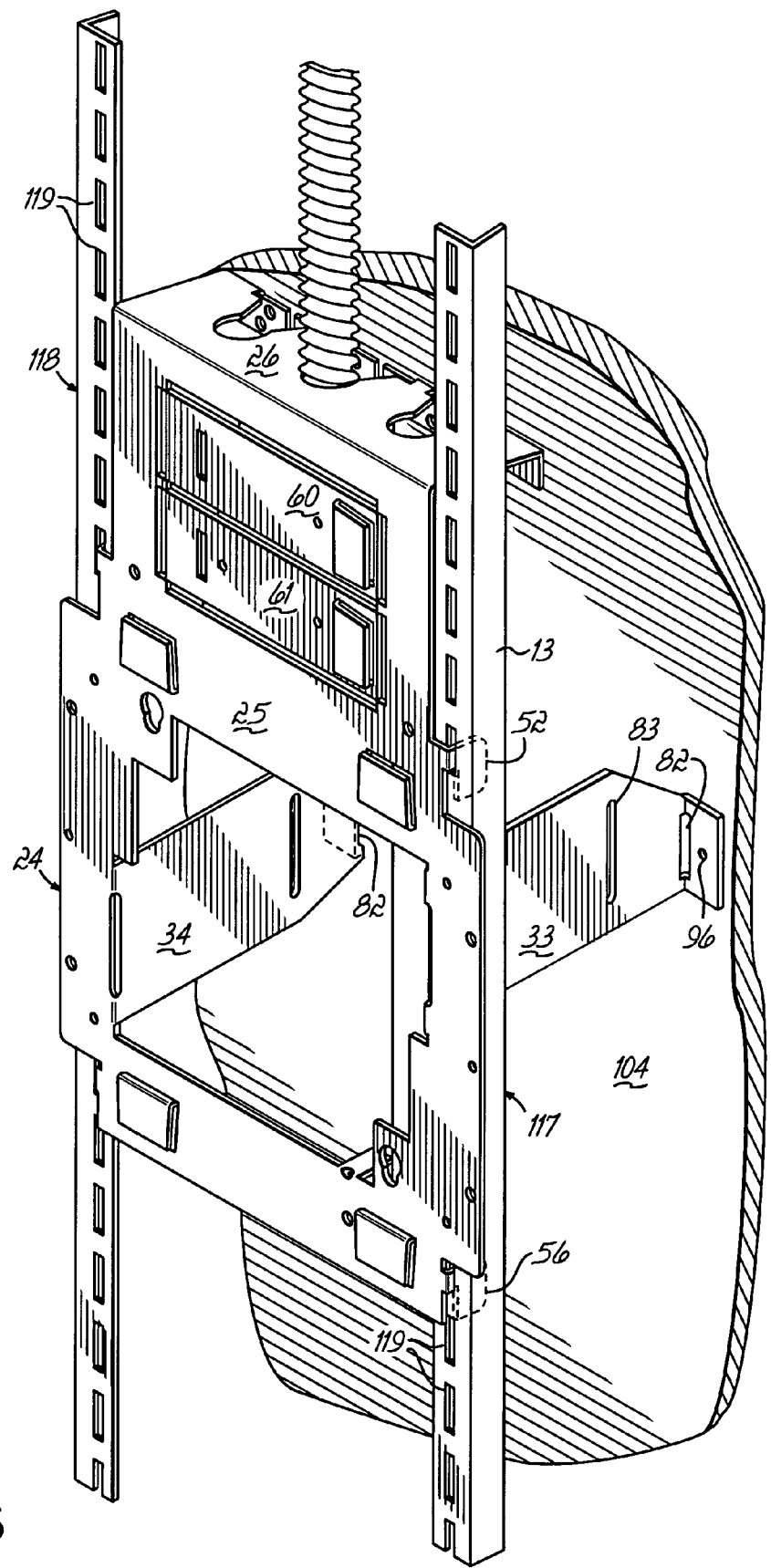
FIG. 6 is a perspective view partially broken away showing the metal bracket attached to support legs.
Figure 7:
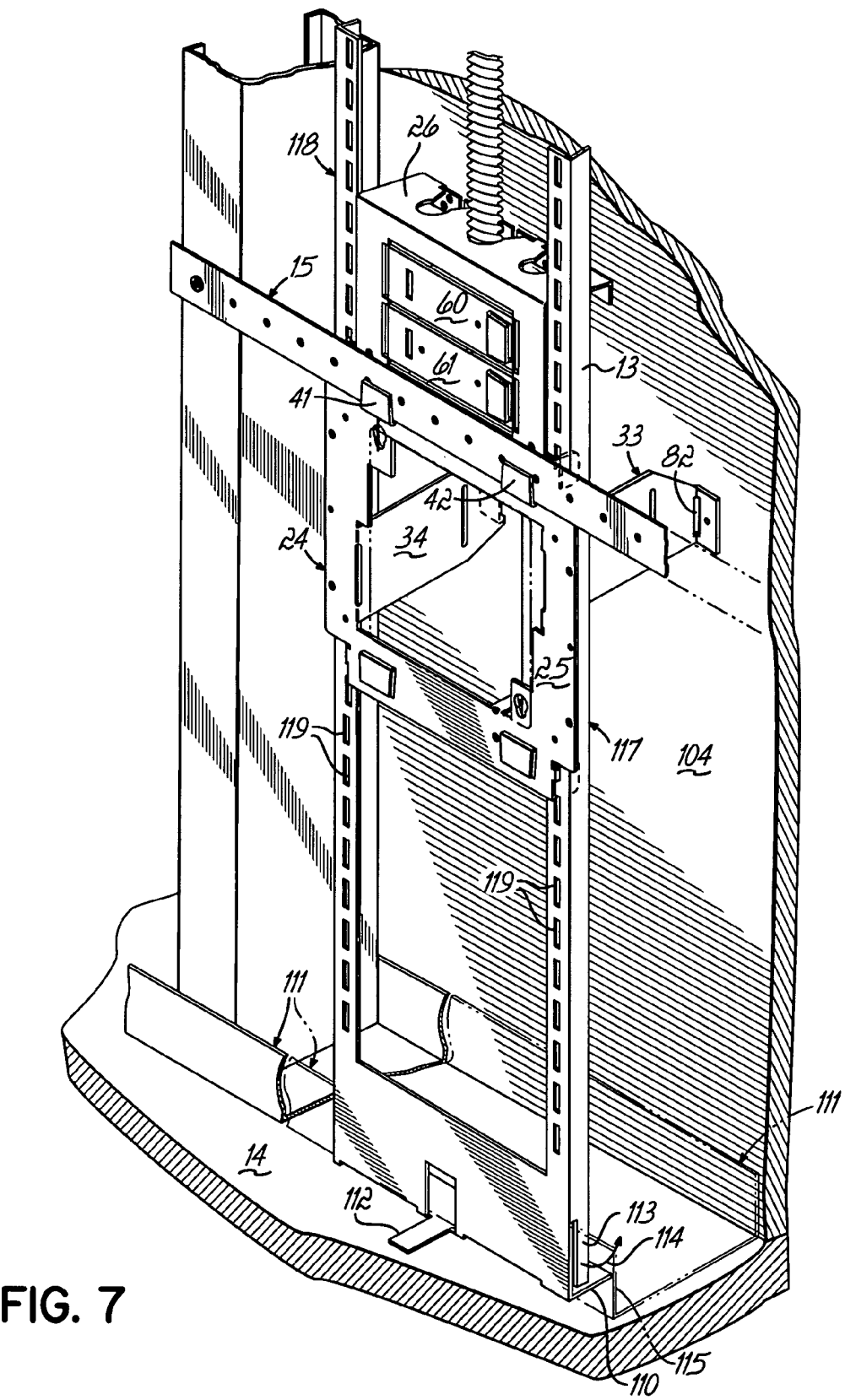
FIG. 7 is a perspective view of the present invention attached to a support structure supported on a floor.

As shown in FIG. 1, the present invention is a bracket 10 adapted to support an electric box 11 and one or more electric cables 12 (one shown). The bracket 10 can be used in a variety of different configurations. As shown in FIGS. 6 and 7, it can be attached to a base 13 which is, in turn, supported on floor 14. As shown in FIG. 4, it can be attached by first and second straps 15 and 16 between two adjacent studs (only one shown) 17. Further, as shown in FIG. 3, it can be attached to a single stud 19 with its edge 20 centered on a center line 18 of stud 19.

Figure 2:
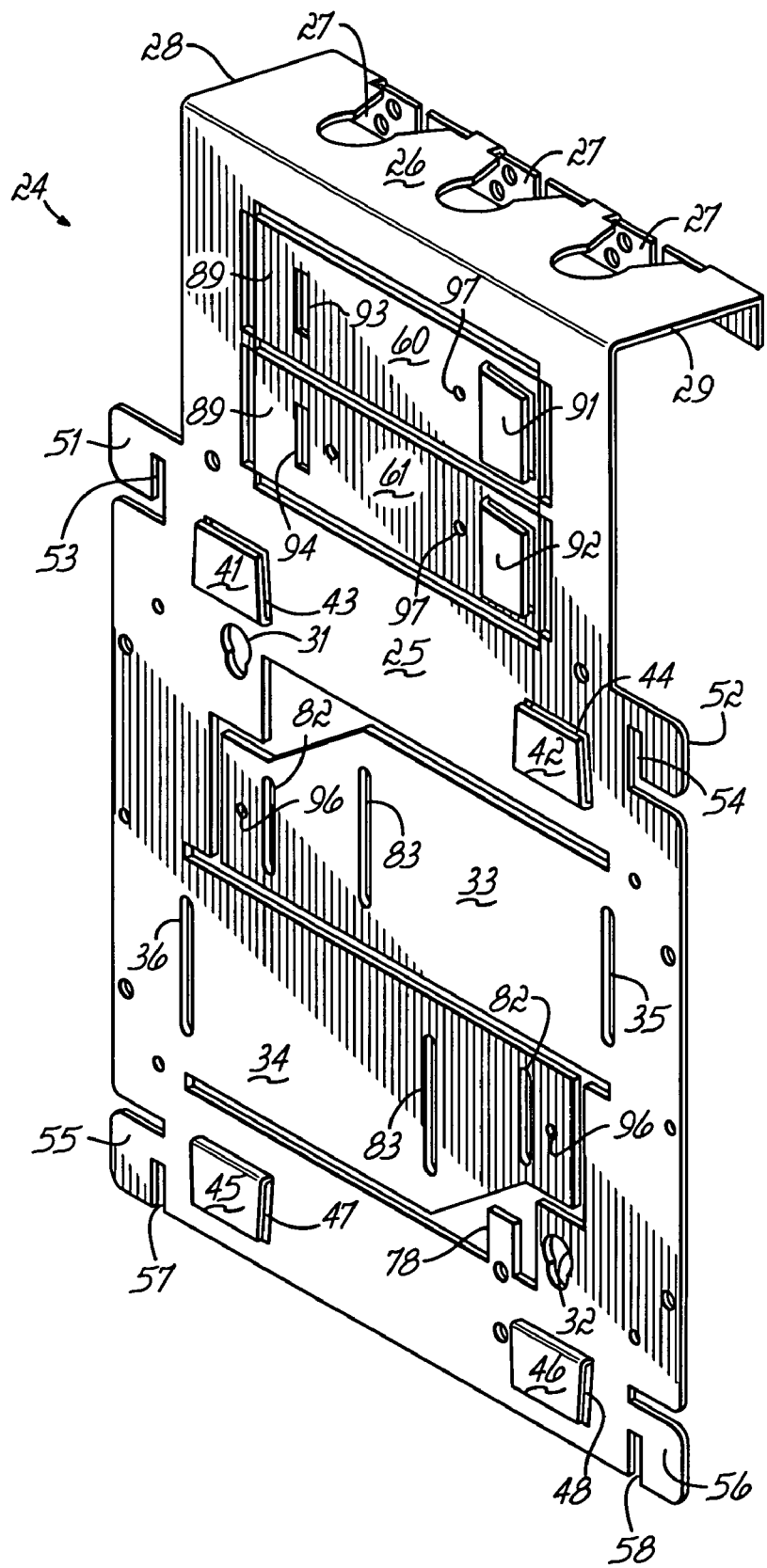
FIG. 2 is a perspective view of the stamped metal bracket shown in FIG. 1.

FIG. 2 shows the stamped blank 24 which forms the bracket of the present invention. Blank 24 includes a metal plate portion 25 and an upper cable support 26. The cable support includes a plurality of cable holders 27. The cable support 26 is bent backwards out of the plane of the metal plate 25 and includes right and left edges 28 and 29, respectively.

The metal plate 25 includes diametrically opposed holes 31 and 32. These holes are in the form of overlapping circles with the upper circle being larger than the lower circle. The upper circle is adapted to receive the head of a screw with the lower portion smaller than the head of the screw. These two holes 31 and 32 provide a support for the electric box 11 as is described hereinafter.

Also located in the metal plate 25 are legs 33 and 34 attached to the metal plate 25 at fold lines or notches 35 and 36. As shown in FIG. 3, when these are bent inwardly, an opening 37 is formed which will align with an electric box mounted at holes 31 and 32.

The metal plate 25 further includes upper angulated tabs 41 and 42 which provide channels 43 and 44 between the tabs and the plane of the metal plate 25. Likewise, lower angulated tabs 45 and 46 provide channels 47 and 48. Straps 15 and 16 rest in these channels to support the bracket 10 between adjacent studs in a stud wall, as is described hereinafter.

The metal plate 25 further includes two upper tabs 51 and 52 with notches 53 and 54. Likewise, the metal plate includes lower tabs 55 and 56 with notches 57 and 58. These four tabs are used to attach bracket 24 to the base 13 when base 13 is employed to support the bracket 24 from the floor.

Also located in the blank 24 are first and second extension legs 60 and 61. These are located between the metal plate 25 and the cable support 26 and are designed to be separated, if needed.

As shown in FIG. 1, the electric cable 12 (only one shown) is fitted into a holder 27. The electric wires (not shown) run through cable 12 into box 11. Legs 33 and 34 are folded 90° along fold notches 35 and 36 providing an opening 37 which aligns with electric box 11. Each leg includes first and second slots 82 and 83 which are designed to allow the legs to be bent. The bent portion 84 is intended to rest against the opposite side 91 of the wall, providing additional stability. The two slots are provided in order to account for walls of different thickness.

As shown in FIG. 1, electric box 11 attaches to bracket 10 with screws 71 and 72 fixed in threaded holes 73 and 74 of the electric box 11. These screws extend through the holes 31 and 32 in plate 25. Normally, the screws would be partially screwed into the holes in the box prior to attaching the box to plate 25. A dry wall ring 77 is attached to the shanks of screws 71,72 at diagonal slots 75 and 76. Tab 78 is bent downwardly, keeping the screws 71,72 in the lower portion of holes 31 and 32, preventing them from separating from bracket 24.

As discussed, this bracket can be used in a variety of different mounting applications. FIG. 3 shows the bracket of the present invention attached to a stud 19. As shown, the bracket is simply positioned against the stud with the left leg 33 abutting the stud, as well as the left edge 28 of the cable holder 27. These two structures align the bracket with the stud with edge 20 of the plate 25 located along a center line 18 of stud 19. A coplanar portion of plate 25 between edge 20 and leg 33 attaches to the stud with screws 90. The bracket 24 is then fixed to the metal stud with sheet metal screws 90. Likewise, the right edge 29 of the cable extension is aligned with the fold line 35 of the right leg 33 which allows the bracket to be mounted on either the right or left side of a metal stud. Tabs 51 and 53, or 52 and 54, when bent 90°, can also align the bracket to the stud.

Figure 5:
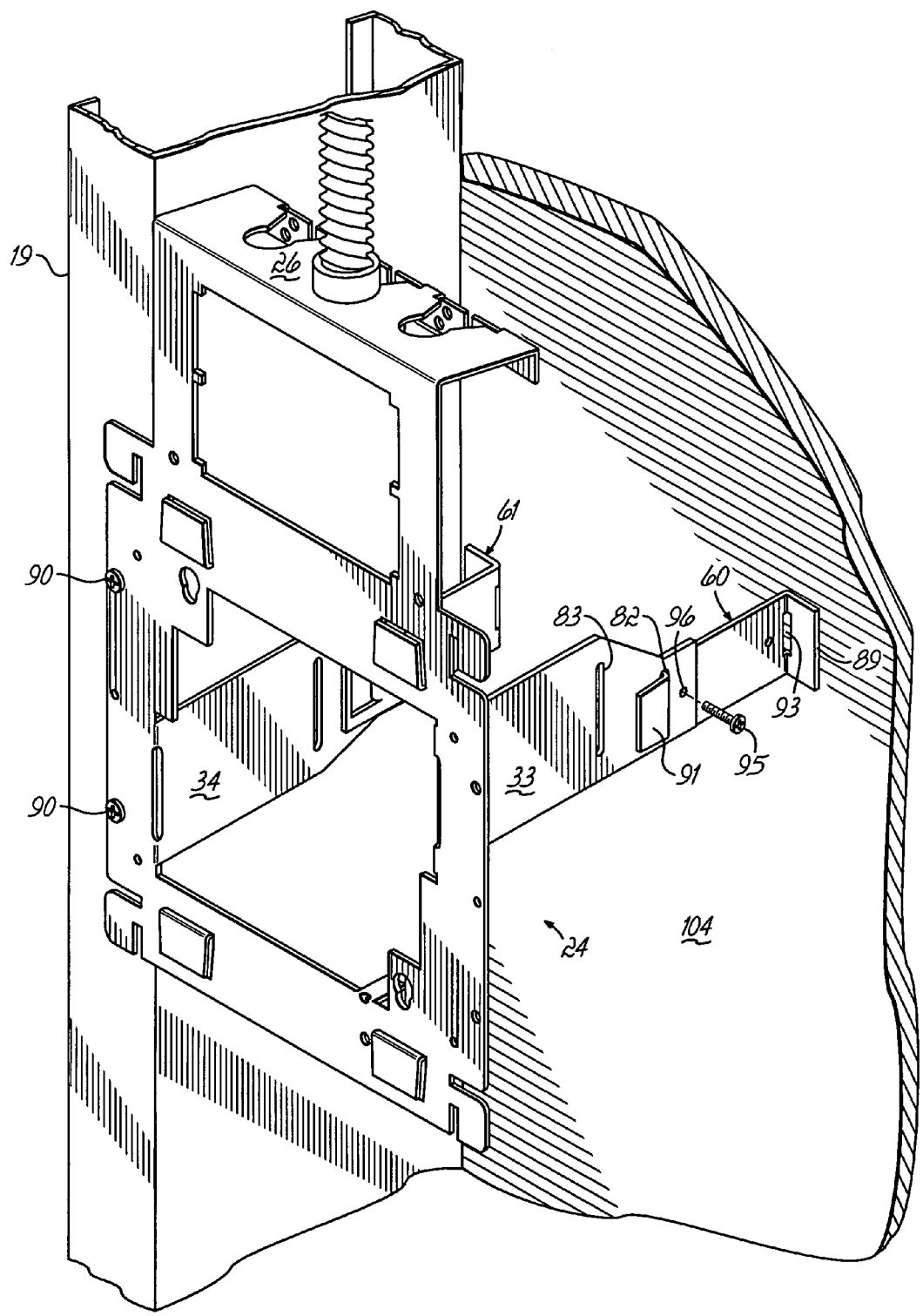
FIG. 5 is a perspective view partially broken away showing the bracket attached to a metal stud.

The bracket can also be mounted to a wall which has an internal width greater than the length of the legs 33, 34. In this embodiment, shown in FIG. 5, leg extensions 60 and 61 are removed from the bracket 10, as these are only held on by small slivers of metal. One each is attached to the inner slots 82 of legs 33 and 34. The leg extensions 60 and 61 include angulated tabs 91 and 92, and slots 93 and 94. The tabs simply fit into the slots 82 of legs 33 and 34. A screw 95 extends through the hole 96 in legs 33 or 34 and through a corresponding aligned hole 97 in leg extensions 60 and 61. Slots 93 and 94 allow for bending the end parts 89 of the extensions. This portion is designed to rest against the inside surface 91 of the wall. With the extension, as well as folding legs at slots 82 or 83, these legs can provide stability from the back surface of a wall wherein the thickness is 2½ inches, 3½ inches, or 5 inches, respectively, providing a great deal of versatility. Further, since the leg extensions are stamped as part of the bracket, they are always present. Therefore, the electrician will always have these when needed.

As shown in FIG. 4, bracket 10 can be attached between two adjacent studs. In this embodiment, the bracket is supported by straps 15 and 16 which run in channels 43 and 44, and 47 and 48, respectively, formed by angulated tabs 41, 42, 45 and 46. Each strap 15 and 16 is attached between two studs 101 (only one shown) by screws 103 which extend through holes 102 in the straps 15 and 16. Again, legs 33 and 34 are bent backwardly to provide support from the rear surface 104. This allows the bracket to be positioned in virtually any location on the wall.

Finally, as shown in FIGS. 6 and 7, the bracket 10 can be supported from a floor surface 14 using base 13. Base 13 includes a horizontal base panel portion 110 which is adapted to slide underneath a base track or sill plate 111 between the track 111 and floor 14. The base panel 110 includes an outwardly extending tab 112 which acts to locate the structure if it is covered up with dry wall. Base 13 further includes left and right tabs 113 (only right tab shown) which are adapted to fold upwardly in the direction of arrow 114 to allow it to extend over the side wall 115 of track 111. Tab 113 is then bent back in the opposite direction to hold the base in place. Base 13 further includes first and second legs 117 and 118. Each leg has a plurality of vertical slots 119.

The bracket 10 is attached to the legs 117 and 118 using tabs 51, 52, 55 and 56. These are all bent inwardly at a 90° angle along slots 53, 54, 57 and 58. These tabs, as shown in FIGS. 6 and 7, fit into respective slots 119 in legs 117 and 118 holding the bracket 10 to the base unit. The tabs can then be folded an additional 90° preventing the bracket from being dislodged from the base. Strap 15 is preferably attached in channels 43 and 44 behind tabs 41 and 42 and screwed onto adjacent vertical studs which firmly holds the bracket in position.

Likewise, legs 33 and 34 are bent 90° as shown in FIGS. 1 and 3 to engage the inner surface of the wall.

Thus, bracket 10 is a multi-purpose bracket for mounting electric boxes. The cable bracket 27, in association with the fold for the legs 33 and 36, maintain the structure properly aligned when attached to a vertical stud, and insures that the outer edge of the bracket lies along the center line of the stud. Further, with the folds in the support legs and the leg extensions 60 and 61, the present invention can be used with a variety of different wall structures of different thickness.

The channels formed with the four angulated tabs allow the bracket 10 to be attached in the middle between two adjacent studs. The bracket can also be attached to a base unit and mounted on a floor. Because of the number of slots in the base, the bracket can be positioned within a few inches of the floor, up to two feet, or more. Thus, the bracket is very versatile which reduces manufacturing expenses, reduces stocking expenses, and insures that the right piece is at the job site when needed.

This has been a description of the present invention along with the preferred method of practicing the present invention. However, the invention itself should only be defined by the appended claims,

The invention claimed is:

1. A bracket for mounting an electric box within a wall said bracket including a plate having a plurality of holes adapted to support said box aligned with an opening in said plate;
   a cable support above said opening, said cable support having a left and a right edge extended away from a plane of said plate;
   said plate further including a left leg and a right leg bendable inwardly at left and right fold lines from said plane of said plate, wherein said left edge of said cable support and said left fold line are aligned and said right edge of said cable support and said right fold line are aligned;
   said plate having coplanar portions extended beyond said fold lines adapted to attach to a stud with one of said fold lines abutted against an edge of said stud.

2. The bracket claimed in claim 1 wherein said plate further comprises left and right tabs bendable at 90° angles, each of said tabs separated from said plate by a slot, said tabs adapted to fit within vertical slots in a base member to support said bracket from a floor.

3. The bracket claimed in claim 1 further comprising leg extension members fixed to an area between said cable support and said plate, said leg extensions adapted to attach to said legs.

4. The bracket claimed in claim 1 further comprising first and second metal straps, said first and second metal straps located within upper and lower channels on said plate and said straps adapted to be fixed to adjacent studs in a stud wall.

5. The bracket claimed in claim 2 in combination with a base member said base member having first and second legs, said first and second legs each including a plurality of vertical slots wherein said vertical slots are adapted to receive said tabs on said plate to hold said bracket in position.

6. The bracket claimed in claim 5 further comprising at least one metal strap, said metal strap fixed to channels in said plate and adapted to attach to adjacent metal studs in a stud wall.

7. A bracket for supporting an electric box comprising first and second straps and a plate, said plate having supports for an electric box and an opening adapted to align with an electric box when supported by said bracket;
   said plate having upper and lower channels along a face of said plate and said first and second straps extended through said channels parallel to the face of said plate;
   said straps adapted to extend between adjacent vertical studs to support said bracket, said bracket further comprising legs, bendable perpendicular to a plane of said plate adapted to provide lateral support for said bracket.

8. The bracket claimed in claim 7 further comprising a cable support fixed to said plate.

9. The bracket claimed in claim 7 further comprising leg extensions adapted to attach to said legs.

10. The bracket claimed in claim 9 wherein said legs each include a slot and said extensions each include a tab adapted to fit within said slot.

11. The bracket claimed in claim 7 further comprising a plurality of tabs bendable 90° relative to the plane of said plate and adapted to fit within vertical slots on legs of a base support.

12. A bracket for supporting an electric box in a stud wall comprising a base and a plate, said base including first and second legs, said legs including a plurality of spaced vertical elongated slots, said plate having a support for an electric box and a hole adapted to align with said electric box when said electric box is supported by said bracket;
said plate further including a plurality of tabs integral with said plate configured to bend and fit into slots in said first and second legs.

13. The bracket claimed in claim 12 further comprising a strap adapted to attach to adjacent studs in said stud wall, said strap further adapted to rest within a channel in said plate.

14. The bracket claimed in claim 12 further comprising a plurality of legs bendable 90° relative to the plane of said plate, said bracket further including leg extensions separable from said bracket and attachable to said first and second legs.

15. The bracket claimed in claim 12 wherein said plate further includes left and right planar portions adapted to attach to a stud.

* * * * *